United States Patent Office 3,224,950
Patented Dec. 21, 1965

3,224,950
CHLORINATION OF AMINOCHLOROPYRIDINE COMPOUNDS
Howard Johnston, Concord, and Mary S. Tomita, Walnut Creek, Calif., assignors to The Dow Chemical Company, Midland, Mich., a corporation of Delaware
No Drawing. Filed Mar. 6, 1962, Ser. No. 177,755
8 Claims. (Cl. 204—158)

The present invention is directed to a novel chlorination process, especially to a method for chlorinating aminochloropyridine compounds. Pyridine compounds containing both amino and chloro groups, particularly polychloro groups are not numerous as a direct outcome of difficulty of preparation. Such routes for preparation as have been employed or have been proposed have required round-about and special methods. Direct chlorination of aminated materials have heretofore resulted in intractable materials, generally tarry oxidation products. According to the present invention, it has been found that amino-polychloro(trichloromethyl)pyridine compounds may be prepared by direct chlorination of certain amino-chloropicoline compounds while the latter is maintained in a liquid state to produce desired products substantially free of undesirable tars and by-products.

The present invention is particularly concerned with a novel, direct chlorination process for the preparation of 4-amino-2,3,5-trichloro-6-(trichloromethyl)pyridine. 4-amino-2,3,5-trichloro-6-(trichloromethyl)pyridine which is disclosed and claimed in copending application Serial No. 177,756 is a crystalline solid, useful as pesticide in both domestic and agricultural operations. The compound may also be used as intermediates in the preparation of certain other pyridine compounds.

According to the present invention, it has been discovered that 4-amino-2,3,5-trichloro-6-(trichloromethyl)pyridine may be prepared in good yields by a novel method wherein a 4-amino-polychloro-2-picoline compound is heated to and/or maintained in the liquid state and gaseous chlorine passed therethrough. The 4-amino-2,3,5-trichloro-6-(trichloromethyl)pyridine product thus prepared is substantially free of undesirable tars and by-products and is suitable for use in most applications without purification.

The 4-amino-polychloro-α-picoline compounds which may be employed as starting materials must contain at least 4 chlorine atoms in the molecule wherein at least two such chlorine atoms are present in the side chain. Suitable starting materials include 4-amino-3,5-dichloro-2-(trichloromethyl)pyridine, 4-amino,3,5-dichloro-2-(dichloromethyl)pyridine, and 4-amino-2,3,5-trichloro-6-(dichloromethyl)pyridine. Suitable materials also include amination mixtures containing several of the above reactants.

The preferred embodiment of the present invention is a process for the preparation of 4-amino-2,3,5-trichloro-6-(trichloromethyl)pyridine by the direct chlorination in the liquid state of 4-amino-3,5-dichloro-2-(trichloromethyl)pyridine or a 4-amino-3,5-dichloro-2-(trichloromethyl)pyridine composition. By "a 4-amino-3,5-dichloro-2-(trichloromethyl)pyridine composition" is meant an amination mixture which is predominantly 4-amino-3,5-dichloro-2-(trichloromethyl)pyridine but is inclusive of mixtures containing from major amounts to those substantially completely 4-amino-3,5-dichloro-2-(trichloromethyl)pyridine. In this embodiment, the chloro group is introduced at a position "meta" with respect to the amino nitrogen contrary to expectations from known chlorination behavior of aromatic amines to produce high yields of the desired product in a more readily purifiable form.

In carrying out the reaction, excess chlorine is passed through the appropriate reactant at a temperature from that sufficient to maintain the reaction mixture in a liquid state, usually about 110° C. to a maximum temperature of about 165° C. The preferred temperature range is from about 120° C. to about 150° C. The reaction may be carried out in the presence or absence of a solvent or diluent. If solvent is employed, the appropriate solvents are chlorinated solvents such as carbon tetrachloride, dichloromethane or hexachlorobutadiene. Oftentimes, it is advantageous to employ solvent so that the introduction of chlorine gas may be initiated at room temperature. The temperature of the reaction mixture is then gradually increased to reaction temperature. Lower boiling solvents may vaporize off, however, this is of no disadvantage since it will have performed the desired function. The reaction may be carried out in the presence or absence of a catalytic light source. The use of irradiation is considered preferable. A light source emitting light at a wave length of from about 2000 A. to 5000 A. and particularly between about 3000 A. to about 4000 A. are suitable. When the reaction is carried out in the presence of light, the light source may double as a source of heat. The rate and total time for the administration of chlorine may vary with such factors as the presence or absence of an irradiation source, size of run, size and/or shape of vessel, temperature of reaction, etc. In batch experiments, the time varies from a few hours with irradiation to about 8 to 12 hours in the dark. The amount of chlorine to be employed varies from a slight excess to a large excess. In general, only a slight excess is required if adequate contact of the reactants is assured by means such as recycling the chlorine or employing slow introduction rates. However, unless such techniques as recycle or counter-current flow is employed, it is preferable to employ higher rates and excess chlorine. After completion of the reaction, the mixture contains substantially pure product and may be employed without further treatment. If desired, the product may be further purified by conventional procedures such as fractional distillation and/or recrystallization.

The following examples illustrate the invention but are not to be construed as limiting:

*Example 1*

8.0 grams (0.028 mole) of 4-amino-3,5-dichloro-2-(trichloromethyl)pyridine was placed in a tubular reaction vessel and irradiated with an ultraviolet light source and heat applied to melt the solid reactant. Chlorine gas was bubbled through the liquid for about 4 hours. The temperature of the reaction mixture during the reaction period was from 145° to 155° C. As the result of these operations, a reaction took place with the formation of the desired 4-amino-2,3,5-trichloro-6-(trichloromethyl)-pyridine product. The reaction mixture was then allowed to cool to room temperature and dissolved in dichloromethane. The product was precipitated from the dichloromethane solution by adding n-heptane thereto, heating and chilling the resulting mixture, and was obtained in a first crop yield of 6.15 grams or 70 percent of theoretical. The product after two recrystallizations from dichloromethane melted at 130°–131° C. Mixed melting point determination with a known sample melting at 119°–121° C. which had previously been prepared and determined to be the authentic compound by comparison with 4-amino-2,3,5-trichloro-6-(trichloromethyl)pyridine product prepared by an entirely different method, gave a melting point of 128°–129° C. The identity of the product was substantiated by vapor phase chromatographic and infra-red analyses. Elemental analyses were as follows:

|  | Carbon | Hydrogen | Nitrogen | Chlorine |
|---|---|---|---|---|
| Found | 22.95 | 0.65 | 9.0 | 67.1 |
| Theory | 22.85 | 0.64 | 8.9 | 67.4 |

Example 2

Forty grams (0.14 mole) of 4-amino-3,5-dichloro-2-(trichloromethyl)pyridine was placed in a tubular apparatus and the reactant irradiated and heated with a sun lamp as ultraviolet light source. Chlorine gas was then passed therethrough at a rate of about 0.35 mole per hour for a period of about 2.75 hours while the reaction mixture was maintained at about 165° C. to obtain a 4-amino-2,3,5-trichloro-6-(trichloromethyl)pyridine product having a molecular weight of 315.

Example 3

In a similar operation, chlorine gas was passed into a flask containing 460 grams (1.64 mole) of 4-amino-3,5-dichloro-2-(trichloromethyl)pyridine at a rate of about 0.65 mole per hour for 15 hours. During this period, the reaction mixture was held in the range of from about 160° to 165° C. and irradiated with ultraviolet light by application thereto of a reflector sun-lamp. At the end of this period the reaction mixture was allowed to cool to obtain 471 grams or 91 percent yield of a 4-amino-2,3,5-trichloro-6-(trichloromethyl)pyridine product. The product had elemental analyses as follows:

|  | Carbon | Hydrogen | Nitrogen | Chlorine |
|---|---|---|---|---|
| Found | 23.1 | 0.71 | 8.7 | 67.2 |
| Calculated | 22.85 | 0.64 | 8.9 | 67.4 |

Example 4

Amination mixtures containing from about 75% to about 90% of 4-amino-3,5-dichloro-2-(trichloromethyl)pyridine and also containing minor proportions of 4-amino-3,5-dichloro-2-(dichloromethyl)pyridine, 4-amino-2,3,5-trichloro-6-(dichloromethyl)pyridine and 4-amino-2,3-dichloro-6-(trichloromethyl)pyridine were pooled. 18.15 grams of the resulting mixture was dissolved in carbon tetrachloride and transferred into a tubular vessel. Gaseous chlorine was bubbled through the mixture while the mixture was irradiated with a sun-lamp. During this process, the temperature gradually rose and was accompanied by loss of solvent. Chlorination was continued for about four hours, during which time the temperature of the reaction mixture was kept for most part between about 150° and 160° C. At the end of this period, the reaction mixture was allowed to cool to obtain 17.3 grams of 4-amino-2,3,5-trichloro-6-(trichloromethyl)pyridine product having a molecular weight of 315. Comparison of infra-red spectra of the product thus obtained with purified 4-amino-2,3,5-trichloro-6-(trichloromethyl)pyridine showed absence of impurities in the product.

Example 5

An amination mixture containing about 31% 4-amino-3,5-dichloro-2-(trichloromethyl)pyridine, 17% 4-amino-3,5-dichloro-2-(dichloromethyl)pyridine and 28% 4-amino-2,3,5-trichloro-6-(trichloromethyl)pyridine and containing minor proportions of other components, was chlorinated in a manner similar to that previously described by passing gaseous chlorine through the mixture at a rate of about 0.3 mole per hour. The chlorination was carried out over a period of about 4 hours during which time the temperature was gradually raised from about 70°–80° C. to about 140° C. Most of the chlorination was carried out at temperatures between 125° and 140° C. to produce the desired 4-amino-2,3,5-trichloro-6-(trichloromethyl)pyridine product. Comparative infra-red spectral analyses with purified 4-amino-2,3,5-trichloro-6-(trichloromethyl)pyridine indicated the product to be a substantially pure product.

Example 6

12 grams (0.05 mole) of 4-amino-3,5-dichloro-2-(dichloromethyl)pyridine is dissolved in 55 milliters of hexachlorobutadiene. The resulting solution is irradiated and gaseous chlorine bubbled into the mixture. The introduction of chlorine gas is initiated at room temperature and continued as heat is applied and increased slowly until a temperature of 165° C. is reached. The reaction mixture is maintained at this temperature for about three hours to obtain the desired 4-amino-2,3,5-trichloro-6-(trichloromethyl)pyridine product which crystallizes on cooling to room temperature as a white, crystalline mass, having a molecular weight of 315.

Example 7

1.0 gram (0.0036 mole) of 4-amino-2,3,5-trichloro-6-(dichloromethyl)pyridine was dissolved in 5 milliliters of hexachlorobutadiene, the reaction mixture irradiated with ultraviolet light and gaseous chlorine bubbled therethrough, starting at room temperature. The temperature was increased to 140° C. in about ¼ hour and the reaction mixture was maintained between about 140° and 150° for about 2.5 hours while the passage of chlorine gas was continued. Vapor phase chromatographic analysis of the reaction mixture at about two hours from the time of initiation of the reaction indicated over 82% conversion of the reacted 4-amino-2,3,5-trichloro-6-(dichloromethyl)pyridine to the desired 4-amino-2,3,5-trichloro-6-(trichloromethyl)pyridine product. After completion of the heating, the reaction mixture was distilled under reduced pressure to remove most of the hexachlorobutadiene, the residue treated with n-haptane to precipitate unreacted starting material, the latter removed by filtration, the filtrate subjected to distillation under reduced pressure to remove more of the hexachlorobutadiene solvent, and the residue washed with a mixture of pentane and n-heptane and cooled to precipitate the desired 4-amino-2,3,5-trichloro-6-(trichloromethyl) product as a crystalline solid. The produce after recrystallization from pentane had a melting point range of 121°–124° C.

4-amino-3,5,6-trichloro-2-(trichloromethyl)pyridine may be employed for the control of plant pests. In such application, it is found that germination and growth of seeds of broad-leaf plants may be obtained when aqueous dispersions containing the compound are applied to beds infested with seeds of broad-leaf weeds at a rate of about 160 pounds per acre. The compound may also be employed for the control of insect pests both domestic, such as house-fly and cockroach, and agricultural, such as mites and aphids.

The 4-amino-polychloro-2-picoline compounds which are starting materials may be prepared by heating together liquid ammonia and the appropriate chloropicoline or chloropicoline mixture in a sealed vessel at temperatures of from about 70° to about 190° C. at autogenous pressure. By appropriate chloropicoline is mean a chloropicoline which corresponds to the 4-amino-polychloro-2-picoline in structure except in having a chloro in the 4-position instead of amino. The chloropicoline or chloropicoline mixture suitable for amination may be prepared by bubbling chlorine through picoline hydrochloride or picoline in a chlorohydrocarbon solvent for from about 5 to about 50 hours. The mixture is then fractionally distilled to recover the desired chloropicoline or chloropicoline composition for amination.

We claim:

1. A method for preparing amino-polychloro(trichloromethyl)pyridine compounds which comprises heating amino-chloropicoline compounds to a liquid state and passing gaseous chlorine therethrough at temperatures from that sufficient to maintain the reaction medium in a liquid state to about 165° C.

2. A method for preparing 4-amino-2,3,5-trichloro-6-(trichloromethyl)pyridine which comprises
   (1) heating to and maintaing in the liquid at temperatures of from about 110° C. to about 165° C. state a 4-amino-polychloro-α-picoline compound, and
   (2) passing gaseous chlorine therethrough.

3. A method for preparing 4-amino-2,3,5-trichloro-6-(trichloromethyl)pyridine which comprises
   (1) heating to a liquid state a 4-amino-polychloro-α-picoline compound, and
   (2) passing gaseous chlorine thereinto while a sufficiency of heat is applied to maintain the reaction medium in a liquid state and wherein the permissible upper limit of the temperature is about 165° C.

4. A method according to claim 3 wherein the heating is accomplished by an actinic light source.

5. A method for preparing 4-amino-2,3,5-trichloro-6-(trichloromethyl)pyridine which comprises
   (1) heating a 4-amino-polychloro-α-picoline compound to a temperature of from about 110° C. to about 160° C., and
   (2) passing gaseous chlorine into the resulting liquid medium.

6. A method for preparing 4-amino-2,3,5-trichloro-6-(trichloromethyl)pyridine which comprises
   (1) heating a 4-amino-polychloro-α-picoline compound to a temperature of from about 110° C. to about 160° C., and
   (2) passing gaseous chlorine thereinto while the reaction medium is irradiated with an ultraviolet light source.

7. A method for preparing 4-amino-2,3,5-trichloro-6-(trichloromethyl)pyridine which comprises
   (1) heating a 4-amino-3,5-dichloro-2-(trichloromethyl)pyridine composition to a temperature of from about 110° C. to about 160° C., and
   (2) passing gaseous chlorine thereinto while the reaction medium is irradiated with an ultraviolet light source.

8. A method for preparing 4-amino-2,3,5-trichloro-6-(trichloromethyl)pyridine which comprises
   (1) heating 4-amino-3,5-dichloro-2-(trichloromethyl)pyridine to a temperature of from about 120° C. to about 150° C., and
   (2) passing gaseous chlorine thereinto while the reaction medium is irradiated with an ultraviolet light source.

References Cited by the Examiner

Chichibabin et al.: Chem. Abstracts, vol. 23, p. 2182 (1929).

English et al.: J. Am. Chem. Soc., vol. 68, pp. 453–6 (1946).

Herttog et al.: Rec. Trav. Chem., vol. 70, pp. 353–60 (1951).

Klingsberg: "Ppyridine and its Reriv., pt. 2, p. 308. (1961).

McBee et al.: Ind and Eng. Chem., vol. 39, pp. 389–391 (1947).

Parker et al.: J. Am. Chem. Soc., vol. 69, pp. 63–65 (1947).

Sell: J. Chem. Soc., vol. 93, pp. 1993–5 (1908).

Wibaut et al.: Rec. Trav. Chim., vol. 58, pp. 709–15 (1939).

WALTER A. MODANCE, *Primary Examiner.*

D. McCUTCHEN, *Examiner.*